(12) United States Patent
Chiu

(10) Patent No.: US 7,215,824 B2
(45) Date of Patent: May 8, 2007

(54) METHOD FOR ADJUSTING IMAGE DATA WITH SHADING CURVE

(76) Inventor: Chui-Kuei Chiu, 215, Sec. 1, Heng-Shan St, Heng-Shan Tsun, Heng-Shan Hsiang, Hsin-Chu (TW)

( * ) Notice: Subject to any disclaimer, the term of this patent is extended or adjusted under 35 U.S.C. 154(b) by 638 days.

(21) Appl. No.: 10/237,658

(22) Filed: Sep. 10, 2002

(65) Prior Publication Data

US 2004/0047515 A1  Mar. 11, 2004

(51) Int. Cl.
*G06K 9/40* (2006.01)
*G06K 9/00* (2006.01)

(52) U.S. Cl. .................................................. 382/274
(58) Field of Classification Search ................ 382/274, 382/275, 162, 167, 261, 270; 358/518, 3.86, 358/1.9, 463; 345/673
See application file for complete search history.

(56) References Cited

U.S. PATENT DOCUMENTS 6,535,302 B1 * 3/2003 Ikeda et al. ................. 358/3.26
6,801,670 B2 * 10/2004 Kijima et al. ............... 382/274
6,920,251 B2 * 7/2005 Toriyama .................... 382/274
2002/0054395 A1 * 5/2002 Kubo ......................... 358/518

* cited by examiner

*Primary Examiner*—Amir Alavi
(74) *Attorney, Agent, or Firm*—Berkeley Law & Technology Group, LLP

(57) ABSTRACT

The present invention provides a determination method to obtain the optimum image output quality. The method comprising the standard white plate is scanned prior to the scanning document sheet to obtain a first image data. Then, the first image data is calculated to generate the shading curve, noise level, and brightness data, which corresponding to each sensor device. Next, the shading curve or standard values returned to input into the calibration database. Thereafter, the scanning device scanned and exposed the document sheet to obtain a second imaging data that corresponding to each sensor device and to read out the standard curve (shading curve) from the calibration memory simultaneously. Next, a determination method utilized to determine the difference value between the two pixels at neighboring position, if the difference value is smaller than the standard value, then the two neighboring pixels is to be averaged and outputted the average value; else, the output pixel value is equal to the original position of the pixel value. Finally, the corrected image data is outputted which is corrected by calibration method.

22 Claims, 3 Drawing Sheets

METHOD FOR ADJUSTING IMAGE DATA WITH SHADING CURVE

BACKGROUND OF THE INVENTION

1. Field of the Invention

The present invention generally relates to an image-capturing device of a scanner, and more particularly to a method for correcting the image information to reduce the image noise during scanning process.

2. Description of the Prior Art

In a digital reproducing apparatus or facsimile apparatus, an image reading apparatus having a photoelectric transducer such as CCD (charge-coupled device) is used to photoelectrically read an image of a document sheet. In such an image reading apparatus, a processing function called shading correction is provided in order to eliminate a scatter in a read output level due to a variance of sensitivity of an intensity of exposure light to the document sheet and a variance of sensitivity of the photoelectric transducer and uniformly read an image density.

In a prior art shading correction, a standard white plate of a know density is provided outside a document sheet read area, and the standard white plate is read prior to the reading of the document sheet and the read signal is stored in a memory. The scatter of the read output level can be detected by the signal stored in the memory. Accordingly, in order to eliminate the detected scatter, the shading correction is made to read data based on the data stored in the memory, when the document sheet is read.

In general, the read apparatus electrically main-scans the document sheet by using a linear CCD to read it and sub-scans it by mechanically moving the read line of the CCD transversely to the direction of the main scan. The standard white plate is located at a start of read position in the direction of sub-scan.

In the shading correction, a multiplication factor to render the light intensity data from the standard white plate for each pixel stored in the memory to a light intensity corresponding to the know density of the standard white plate is determined for each pixel and it is stored in the memory.

When the document sheet is read, the multiplication factor corresponding to the read pixel is read from the memory and it is multiplied to the document sheet read signal to effect the shading correction.

In the prior art, since the document sheet is mounted on a platen glass, the document sheet read signal is one transmitted through the platen glass. On the other hand, the standard white plate is formed by applying it on a thin metal plate and it is not always arranged at the same level as that of the document sheet but it is in many cases at a level of the bottom surface of the platen glass. Accordingly, the standard white plate is located closer to an illumination lamp than the document sheet is.

In addition, while the document sheet covered by the platen glass, the applied read plane of the standard white plate is exposed to the light source and the sensor device. As a result, in a long time use, the standard white plate exposed to the illumination significantly fades and the density level greatly deviates from the initially set level.

As a result, in spite of the fact that the shading correction is made on the assumption that the standard white plate has a know density, the signal derived by reading the standard white plate is not proper one due to a difference in the optical path lengths from the surface of the document sheet and a change in the density of the standard white plate.

On the other hand, it is an important drawback for the prior art is that the lamp brightness of the linear image scanner will be different due to the using time, the ambient temperature, and the variation position to obtain the image with noise. Further, the response is different for each sensor of linear sensor device so as to utilize to scan a standard white plate to obtain a standard curve. Therefore, the prior art is provided a method for scanning standard white plate is required to utilize prior to scan the document sheet to obtain the standard curve. Due to the scanning speed is increased to cause the duration of line exposing is shorted and the size of sensor device is reduced from 7 um to 4 um thereby the image noise will be increased, the output signal quality (S/N ratio) is descend, and the gain will be increased simultaneously. In addition, due to the lamp type (shaped or characteristic), the output of the two ends of lamp is smaller than the center of the lamp, and the output image noise will also be increased.

Referring to FIG. 1 that represents a flow diagram for the steps of the conventional image correction. According to flow diagram, step 1 is scanning the standard white plate to obtain a first image data; step 2 is calculating the first image data to obtain the shading curve (standard curve); step 3, according to step 2, we can obtain a shading curve corresponding to each sensor device; step 4, inputting the shading curve into the calibration memory with a calibration database; step 5, performing exposing and scanning process to the document sheet to obtain a second image data; step 6, reading out the shading curve corresponding to each sensor device; step 7, calculating the shading curve; and the step 8, outputted the corrected image data.

According to abovementioned, the calibration procedure only performing a calculation process to the shading curve from scanning the standard white plate, thus, the output signal still have error between the originally image and output image. Therefore, the noise and gain still a problem during the scanning the document sheet.

SUMMARY OF THE INVENTION

It is an object of this invention to provide a method to improve the output image quality It is a further object of this invention to provide a determination method to obtain the exact pixel position and improve the output image quality.

It is still another object of this invention to provide a standard value to compare with the value of the two pixels at neighboring position to determine the output image data to reduce the noise level.

According to abovementioned objects, the present invention provides a determination method to obtain the optimum image output quality. The method comprising the standard white plate is scanned prior to the scanning document sheet to obtain a first image data. Then, the first image data is operated to generate the shading curve, noise level, and brightness, which corresponding to each sensor device such as a charge-coupled device (CCD). Next, the shading curve (or standard values) returned to input into the calibration memory within a calibration database. Thereafter, the scanning device scanned and exposed the document sheet to obtain a second image data that also corresponding to each sensor device and read out the shading curve from the calibration database simultaneously. Then, a calibrating operation is performed to the shading curve and second image data, and output the output calibrated image data. Next, as a key feature of the present invention, a determination method is utilize to determine the difference value between the neighboring two pixels, if the difference value is smaller than a standard value, two pixels is to be averaged and outputted the average value; else, the output pixel value is equal to original position of the pixel value. Finally, outputting the corrected image data, which is calibrated by a calibration method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
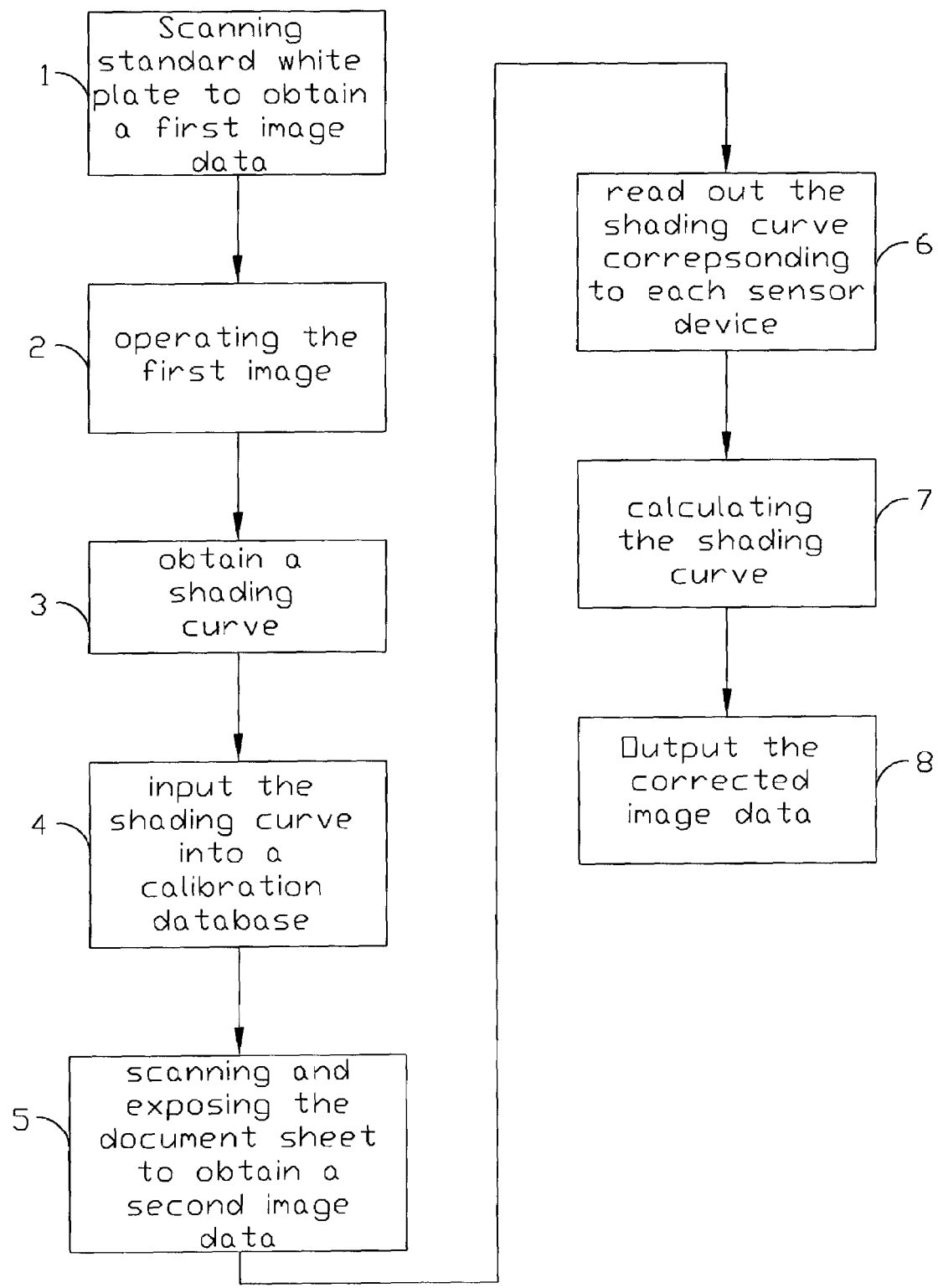
FIG. 1 is a flow diagram showing the steps for correcting the image data in accordance with a conventional correction method.
Figure 2:
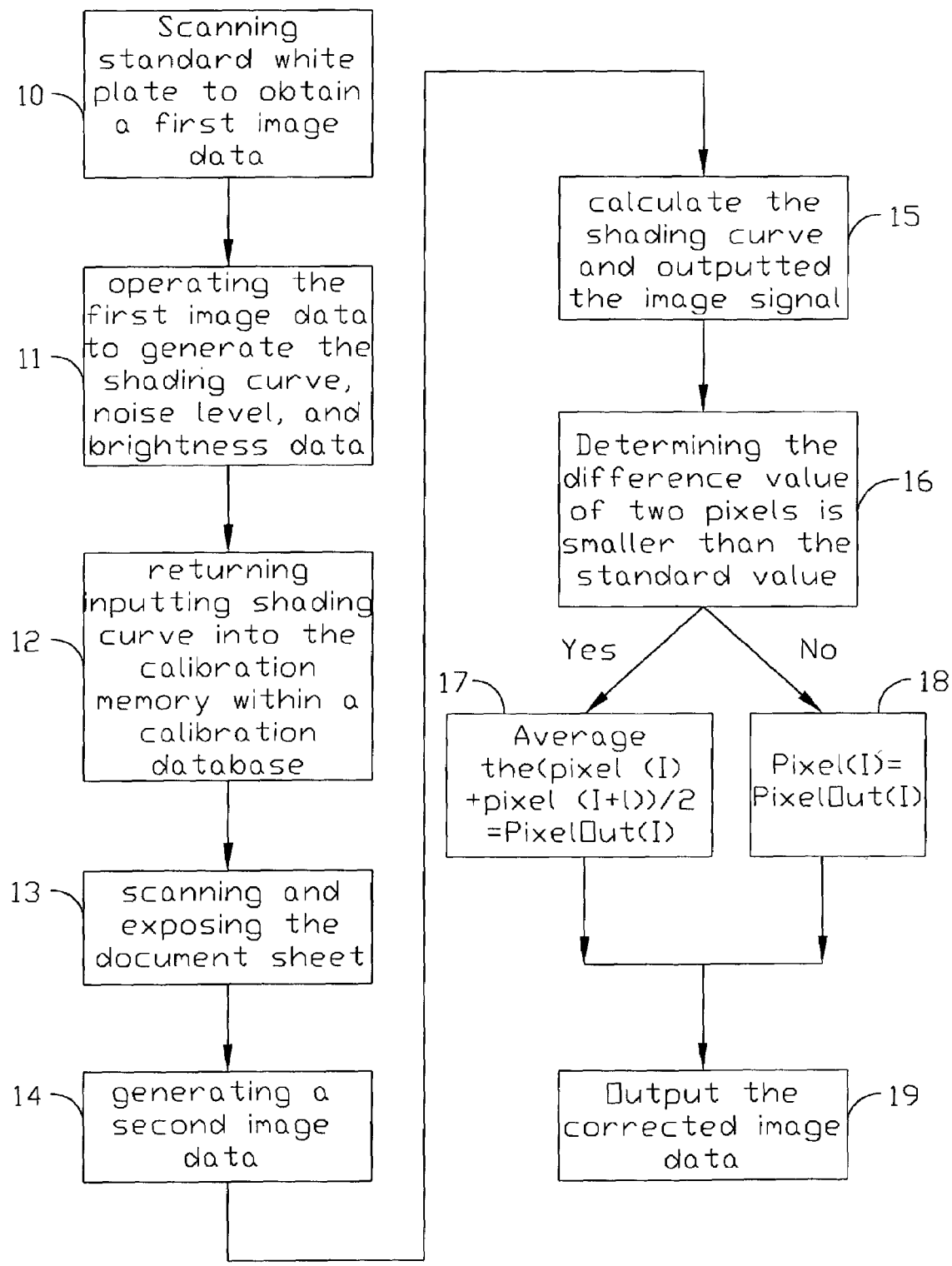
FIG. 2 is a flow diagram showing the steps for correcting the image data in accordance with a method disclosed herein.

FIG. 2 is a flow diagram summarizing the steps in one method of forming a corrected image data in accordance with this disclosure. Step 10 represents a standard white plate is scanned prior to the document sheet to obtain a first image data. Then, step 11 represents the image data is calculated to generate the shading curve, noise level, and brightness data which corresponding to each sensor device, wherein the sensor device can be a charge-coupled device (CCD).

In the present invention, a standard value, standard (I), can be pre-set, wherein the standard value can be obtained as following conditions. First, a standard value can be set from scanning the standard white plate; therefore, the standard value can be set a constant. Secondly, the standard value can be calculated from the mean square deviation of the shading curve. Thirdly, the standard value will be different according to the variety position; therefore, the standard value can be pre-set before scanning the document sheet. Fourth, the standard value can be obtained from the shading curve, for example, brightness data.

Next, the step 12 is a key feature of the present invention, the shading curve is returned to input into the calibration memory within a calibration database. In the preferred embodiment of the present invention, the standard value can be also returned to input into the calibration memory simultaneously. Step 13, the document sheet is scanned and exposed to obtain a second image data after the standard white plate is scanned. Step 14, the second image data is corresponding to each sensor device, and is read out the shading curve from the calibration memory simultaneously. Then, step 15, a correction operation is performed to calculate the shading curve and outputted the image signal. Next, step 16 through step 18 as another key feature of the present invention, a determination method is proved to determine the difference value of the two pixels at neighboring position, Pixel (I) and Pixel (I+1), if the difference values of two pixels at neighboring position is smaller than the standard value, then averaged the two pixel at neighboring position to obtain an average value, and the output pixel value is equal to average value, PixelOut(I)=(Pixel (I)+Pixel(I+1))/2; else, the output pixel value is equal to the pixel value at originally position, PixelOut(I)=Pixel(I), wherein the difference value is smaller than the standard values is caused by noise level. Finally, step 19 represents the corrected image data is outputted.

Figure 3:
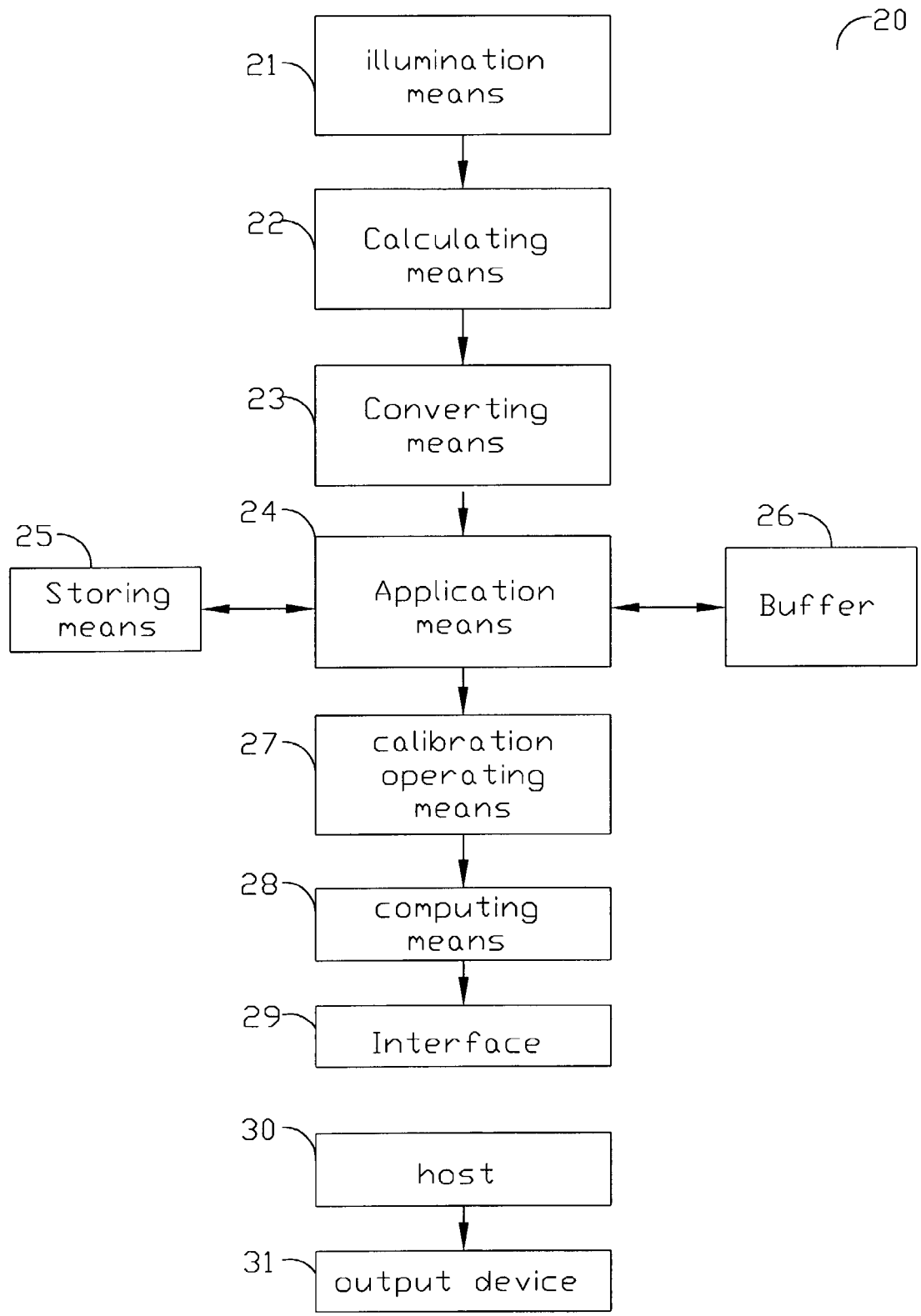
FIG. 3 is a block diagram showing the process for calibrating the corrected image data with a determination method.

Referring to FIG. 3 is a block diagram for a linear image-capturing device. In the block diagram, the linear image-capturing device 20 is utilized a illumination means 21 to scan and illuminate the standard white plate prior to scan the document sheet to obtain the first image data and gain value. Next, a calculating means 22 used to calculate the first image data to obtain shading curve, noise level, and brightness data, which are communicated to the converting means 23 such as ADC (analogy digital convert system) to convert a first analogy signal into a first digital signal. Thereafter, the first digital signal is communicated to the application means 24 such as ASIC (application specific integrated circuit). There are variety of the chip set within the ASIC 24 to process the function for user' command. Herein, if the memory capability of the scanning device cannot process the entire of the first digital signal, the partial first digital signal can communicate to the buffer device 26 to store until the ASIC 24 accessed the first digital signal from the buffer device 26 and to process the remaining first digital signal. Then, the first digital signal returned to input into a storing means 25 to store the first digital signal, wherein the storing means 25 can be calibration memory within the calibration database.

Then, a scanning means 21 is performed to scan and expose the document sheet to obtain the second image data. As the abovementioned, the second image data is communicated the ADC 23 to convert the second analogy signal into the second digital signal. Thereafter, the second digital signal is communicated to the ASIC 24. Then, the second image data is communicated to the storing means 25 and corresponding to each the sensor device and reading out the shading curve (first image data) simultaneously. Next, a calibration operating means 27 performed a calibration operation to output the image signal. Then, as the key of the present invention, the second image data is obtained from scanning the document sheet by an image-capturing device 20, the image data will corresponding to the pixel and compare with the standard value to determine the output image data by a computing means 28. There is a determination method to decide the image output value. When the difference value of the two pixels at neighboring position, Pixel (I) and Pixel (I+1), is smaller than the standard value, the two neighboring pixels should to be averaged and outputted the average value; else, the pixel output value is equal to the original pixel position. Herein, we can write a computer program to explain the determination method of the relationship between the two pixels at neighboring position and standard value.

If |Pixel(I)−Pixel(I+1)|<Standard value

Then PixelOut(I)=[Pixel(I)+Pixel(I+1)]/2

Else PixelOut(I)=Pixel(I)

End

Wherein the Pixel(I), Pixel(I+1) represent the output image of the pixel in different position I and position I+1 of the sensor device.

Therefore, according to the calibrating operation, we can obtain the corrected image data. Then, the corrected image data is communicated to the host 30 by interface 29, wherein the interface 29 can be a USB (universal serial bus), parallel port, SCSI TCP (small computer system interface transmission control protocol), or IR communication (infrared ray communication). Then, the imaging data is communicated to the output device 31, such as monitor, printer, or PDA (personal digital assistant), to display the imaging data of the scanning object.

According to abovementioned, a determination method to treat the corrected image data that render the image variation will not cause the blurry image; further, the average of the two pixel values can reduce the S/N ratio, which is generated from the noise.

Although specific embodiments have been illustrated and described, it will be obvious to those skilled in the art that various modifications may be made without departing from what is intended to be limited solely by the appended claims.

What is claimed is:

1. A method for image correction, comprising:
   obtaining a first set of image data by use of a plurality of scanner image sensors;
   obtaining correction data corresponding to at least a portion of the plurality of scanner image sensors;
   correcting at least a portion of said first set of image data based at least in part on the obtained correction data; and
   comparing corrected image data corresponding to a first scanner image sensor with corrected image data corresponding to a second scanner image sensor having a neighboring position to said first scanner image sensor to obtain further corrected image data.

2. The method according to claim 1, wherein obtaining correction data further comprises:
   obtaining a second set of image data for the plurality of scanner image sensors by scanning a standard white plate; and
   determining a shading curve based at least in part on said second set of image data.

3. The method according to claim 2, further comprising determining noise level for the plurality of scanner image sensors based at least in part on said second set of image data.

4. The method according to claim 2, further comprising determining brightness data for the plurality of scanner image sensors based at least in part on said second set of image data.

5. The method according to claim 1, wherein said comparing corrected image data comprises comparing corrected image data corresponding to a first scanner image sensor with a standard value.

6. The method according to claim 1, wherein said standard value comprises a mean square deviation of said shading curve.

7. The method according to claim 1, wherein said standard value comprises a constant value.

8. A method comprising:
   obtaining a first set of image data for a plurality of scanner image sensors;
   generating a shading curve based at least in part on said first set of image data;
   obtaining a second set of image data for the plurality of scanner image sensors;
   correcting at least a portion of said first set of image data based at least in part on said shading curve; and
   comparing corrected image data corresponding to a first scanner image sensor with corrected image data corresponding to a second scanner image sensor having a neighboring position to said first scanner image sensor to obtain further corrected image data.

9. The method according to claim 8, further comprising determining noise level for the plurality of scanner image sensors based at least in part on said second set of image data.

10. The method according to claim 8, further comprising determining brightness data for the plurality of scanner image sensors based at least in part on said second set of image data.

11. The method according to claim 8, wherein storing said shading curve comprises a calibration means.

12. The method according to claim 8, wherein storing said shading curve further comprises storing said standard value.

13. The method according to claim 8, wherein said comparing corrected image data comprises comparing corrected image data corresponding to a first scanner image sensor with a standard value.

14. The method according to claim 8, wherein said standard value comprises a mean square deviation of said shading curve.

15. The method according to claim 8, wherein said standard value comprises a constant value.

16. A system for correcting scanner image data comprising:
    a comparator, said comparator adapted to compare corrected image data corresponding to a first image sensor of a scanner with corrected image data corresponding to an adjacent second image sensor of the scanner; and
    a computing device, said computing device adapted to average the compared data to obtain corrected scanner image data.

17. The system of claim 16, further comprising:
    a scanning device, said scanning device adapted to obtain a first set of image data;
    a calculator, said calculator adapted to generate a shading curve based at least in part on said first set of image data; and
    a calibrator, said calibrator adapted to correct at least a portion of said first set of image data based at least in part on said shading curve.

18. The system of claim 17, wherein said standard value comprises a mean square deviation of said shading curve.

19. The system of claim 17, wherein said standard value comprises a brightness data of said shading curve.

20. The system of claim 17, wherein said standard value comprises a constant value.

21. The system of claim 17, further comprising storing said shading curve in a storage device.

22. The system of claim 21, wherein said shading curve is stored in a calibration database.

* * * * *

UNITED STATES PATENT AND TRADEMARK OFFICE
CERTIFICATE OF CORRECTION

PATENT NO. : 7,215,824 B2  Page 1 of 1
APPLICATION NO. : 10/237658
DATED : May 8, 2007
INVENTOR(S) : Chiu It is certified that error appears in the above-identified patent and that said Letters Patent is hereby corrected as shown below:

Title Page, section (76), please replace "Heng-Shan St," with --Heng-Shan St.,--.

Signed and Sealed this

Thirteenth Day of April, 2010

David J. Kappos
*Director of the United States Patent and Trademark Office*